Sept. 13, 1966    R. W. LOWRIE    3,272,273
GROUND EFFECT VEHICLE AIR FLOW DESIGN
Filed Oct. 4, 1961    2 Sheets-Sheet 2

*Richard W. Lowrie*

United States Patent Office 3,272,273
Patented Sept. 13, 1966

3,272,273
GROUND EFFECT VEHICLE AIR FLOW DESIGN
Richard William Lowrie, Wayne, Pa.
(1730 Robin Hood Lane, Clearwater, Fla.)
Filed Oct. 4, 1961, Ser. No. 142,939
1 Claim. (Cl. 180—7)

The present invention relates to ground effect vehicles, and more particularly to improvements in the design of the nozzles and other air directing means near the periphery of the ground effect machine.

A ground effect machine is a vehicle which receives a substantial portion of its lift from a positive pressure built up beneath the vehicle while the vehicle is close enough to the surface to be able to entrain the positive pressure beneath the vehicle. This entrainment is generally accomplished by using an annular jet of air to form a "curtain" around the vehicle.

One of the major problems in the use of the ground effect vehicle is the dust, spray, snow, etc., stirred up and blown out from the periphery of the vehicle as a result of the annular jet of air. This spray can be so dense as to stall the engine and the dust may cause visibility to be dangerously reduced as well as presenting a nuisance, and causing erosion of the surface.

In an annular jet ground effect machine or vehicle, a singular annular nozzle is desirable for simplicity. At the same time, it is desirable to reduce or eliminate the spray and dust emanating from beneath the vehicle. There is a particular nozzle and baffle configuration which enables both aims to be accomplished and this configuration forms an important object of this invention. The use of multiple nozzles is not precluded.

A further object of the invention is to facilitate the recirculation of the air to improve efficiency and to minimize or eliminate the need for an external air intake to the fan or air compressor, or other air mover such as an ejector, thus avoiding noise emanating from the intake port, and also avoiding blade stall and related inlet design problems which may appear in forward flight.

A still further object of the invention is to provide a means for preventing soil erosion, snow blowing, water spray, or water ingestion while hovering or moving slowly over the surface.

Other objects and advantageous features will become apparent from the following description and drawings and the following appended claim.

Figure 1:
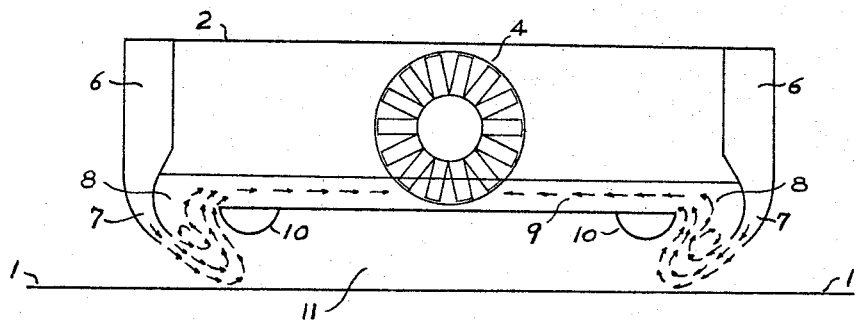
Figure 2:
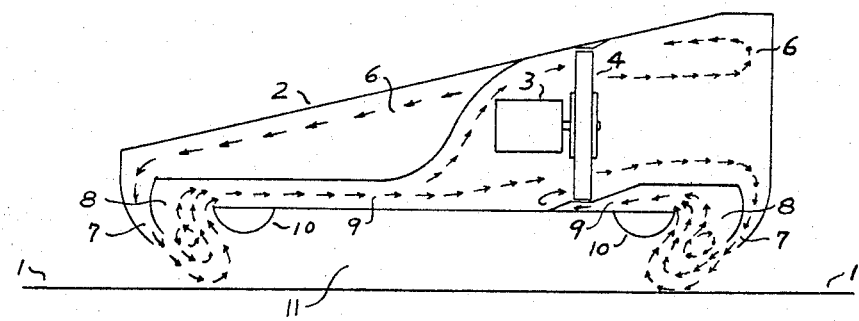
Figure 3:
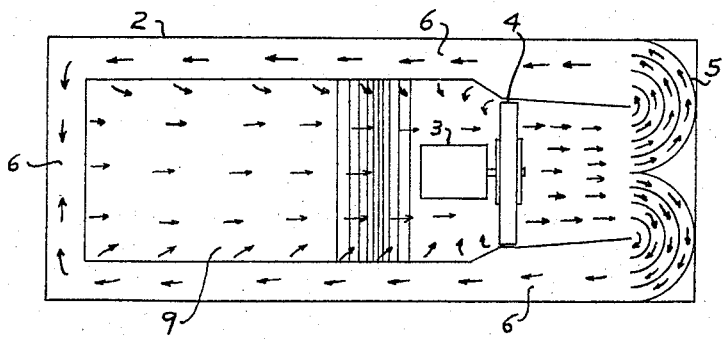

In the drawings, like numbers refer to like objects and FIGURE 1 is a front elevation cross section, FIGURE 2 is a side elevation cross section, FIGURE 3 is a plan view schematic, and the other figures are cross sectional views of a portion of an elevation and are described subsequently.

More particularly, in FIGURES 1, 2, 4, 5, 6, 7, 8, and 9, item 1 represents the surface of the ground or water, and item 2 is the vehicle body proper. In FIGURES 1, 2, and 3, item 3 is an engine driving a fan 4, which causes air to move in the directions shown by the arrows, the air being deflected by turning means 5, confined in ducts 6, passing to nozzles 7 which extend completely around the vehicle; the air then passes down to the surface 1 and is deflected back to annular opening 8, thence through return plenum 9 to the fan 4. A curved or semi-circular type baffle 10 aids in causing the air to flow back up into the vehicle through the opening 8. The baffle may be omitted or may consist of a straight piece extending beneath the vehicle instead of being curved, but best results occur in general when the baffle is as shown on the figures, being some smooth curve. As a result of the annular jet of air, a pressure is built up and maintained in the space 11 beneath the vehicle, causing the vehicle to develop lift and to lift off the surface.

By proper positioning of the annular nozzle 7, the return opening 8 and by properly proportioning the nozzle width and the air velocity leaving the nozzle, a peripheral or toroidal type vortex is set up between the under side of the vehicle and the surface 1, and the air is deflected upward into the opening 8 with very little air escaping from the vehicle outwardly along the surface 1. The establishment of the desired air flow pattern with a minimum of leakage and a maximum of lift to the vehicle is mainly dependent on the proper relative proportioning of the angles, dimensions, and shapes of the nozzle, baffle, and opening. Once optimized, the design is not critical, nevertheless it is generally desirable to determine the best dimensions by an empirical process on a full scale model, properly instrumented, using a typical cross section for the tests, such cross sections being shown in FIGURES 4 through 9. It is important that the opening 8 be adjacent to or very close to the nozzle, that the nozzle angle be adjusted to within 5 to 10 degrees, and that the baffle be smooth and of ample depth and width. The proper interrelationship of these elements to get the desired flow pattern is somewhat similar to a tuning process. The nozzle pressure and duct air flow resistance are also important. Typical values are as follows, for an operating height of seven inches and for a base pressure (average pressure above atmospheric acting on the base of the vehicle) of ten pounds per square foot. The nozzle angle should be 40 degrees from the vertical, the nozzle width two inches, the air velocity leaving the nozzle about 150 feet per second, the opening width eight inches, the baffle shape semi-circular or nearly so, the baffle height five inches, and the opening 8 exposed to atmospheric pressure with no back pressure or suction.

Figure 6:
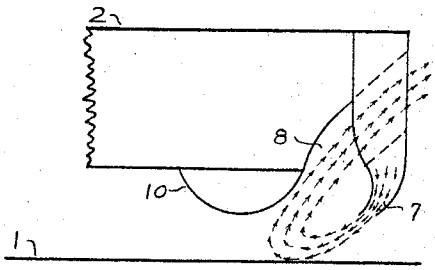

It is not necessary to have the air recirculated to the fan or blower as through plenum 9 in FIGURE 1; the opening 8 can be open to the atmosphere as shown in FIGURE 6 with very good results in that the air leakage along the surface 1 is still minimized and the total lift is nearly maximized. Allowing the air to flow out to the atmosphere as in FIGURE 6 enables jet reaction lateral and directional control by using deflecting vanes or dampers to control the air exhaust direction and magnitude. However, recirculation has the advantages of eliminating the need for an external air intake to the fan with associated problems of noise and inlet design for forward flight, and also the momentum of the air is conserved and the power requirement reduced. Recirculation also means the system is nearly closed, making the use of gases other than air a possibility, particularly on larger vehicles or where multiple annular nozzles are used. Other gases might include steam, hydrogen, helium, or explosive fuel mixtures which could be burned to give a sudden increase in ground clearance for emergency or other special purposes. Recirculation has the disadvantages of causing dusty air to be circulated through the air mover in over land operation. If a fan type air mover is employed it may be desirable to coat the blades to minimize abrasive wear, or to install a centrifugal filter or a barrier type filter. Plastic or rubber lined ducts could be used to minimize corrosion of sea water, and inflatable sections could be used to prevent ice formation in cold weather.

Figure 4:
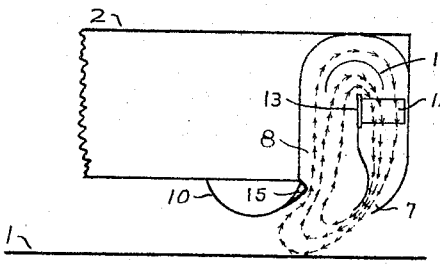

For convenience in minimizing the duct length or for other reasons, more than one fan and more than one drive motor may be used. A complete annular fan can be used. Referring to FIGURE 4, the minimum duct length is obtained when the fan takes the form of air moving blades 12 fastened to an endless belt 13 which moves around the periphery of the vehicle in a circular, oval, or other path. Turning vanes 14 may be used at any point where the air changes direction in a duct. Four horizontal wheels each perhaps a few feet in diameter may be used and placed one in each corner of a rectangular vehicle, and the belt rotated around them in a more or less rectangular path. One or more of the wheels would be connected to the engine and serve to drive the belt. Also, alternatively, jet reaction means may be connected to the belt and serve to drive it around the periphery of the vehicle. The advantages of the belt configuration is the very short duct length which reduces duct losses, and the increased area available within the vehicle for load purposes, since the fan and conventional ducting is removed.

Figure 5:
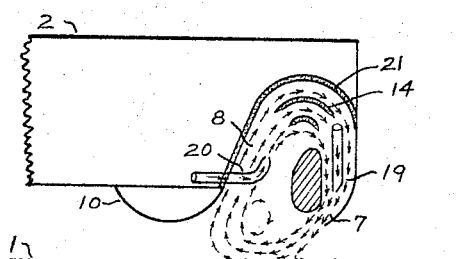

An alternative method to generate the annular air jet which forms the "curtain" is to use an ejector 19 in FIGURE 5. High pressure air, 50 p.s.i. or more, is fed to a primary nozzle 19 or 20 located near the inlet or outlet of the duct. Preferably the ejector primary nozzle is located in the duct inlet so that the nozzle 20 is in or near the opening 8. To minimize noise the duct 8 and turning vanes 14 should be lined with sound absorbing material 21, shown in FIGURE 5. The requisite high pressure air for the nozzle 20 or 19 could be supplied from a conventional air compressor driven by any desired motive power. The ejector eliminates moving parts in the air stream, an advantage in dusty operation.

Generally, the opening width 8 should be approximately equal to or greater than the operating ground clearance. If this holds, and the baffle size and shape are proportionally correct, then the condition of minimum leakage and maximum pressure can be obtained by adjusting the angle of the nozzle a few degrees one way or the other. Slight improvements in lift may be obtained by making the baffle a shape slightly different from the segment of a circle, such as a segment of an ellipse or oval. Also an increased base pressure can be obtained in some cases by placing a small deflector 15 in FIGURE 4 on the baffle.

Because the air makes approximately a 180 degree turn under the vehicle, most of the larger dust particles are thrown under the vehicle and collect near the center. The 180 degree turn is an effective centrifugal filter and prevents the heavier particles of sand, gravel, or dirt from entering the return air opening 8. The action of the air in causing particles to collect at the center under the vehicle may be useful in sweeping, or in agriculture operations such a hilling, ditching, windrowing; and turnover, harvesting, and drying of certain crops.

The 180 degrees, more or less, turn of the air, in combination with some vortexing, make this air flow patternable, not only to greatly reduce leakage air, but also able to build up and maintain a higher base pressure under the vehicle, for a given power, than other air flow patterns. The increase in base pressure is in the order of ten percent for vehicles which do not rise higher than about ten percent of their width from the surface. Also, by recirculation, another ten percent or more can be saved by recovering the kinetic and pressure energy of the air stream.

The leakage air along the surface can be reduced readily to less than 20 feet per second, and with care over a fairly smooth surface, to less than five feet per second. In many cases it is not possible to feel or measure any leakage air. Generally, the nozzle angle and height which gives the least air leakage over land will not be optimum for producing the least spray when operating over water, an adjustment of approximately 20 degrees in nozzle angle being necessary to minimize spray. Therefore, for general purpose vehicles of this type, some means of nozzle adjustment in angle is desirable.

If, for any reason it is desired to convert the air flow pattern from that described in this invention to the conventional pattern where the air simply leaves the nozzle and is turned by the pressure under the vehicle and flows outward along the surface, this may be done simply by closing off the openings 8. Closing the openings 8 selectively is one method of obtaining lateral and directional control.

Figure 9:
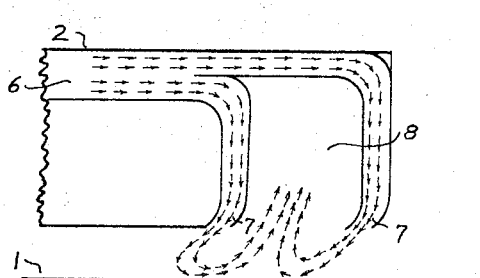

Another method of causing the air to circulate up into the vehicle, and minimize leakage, without using a baffle, is to use two annular nozzles with the return air opening between them as shown in FIGURE 9. Using this configuration, both nozzles must be adjusted independently in angle, air pressure, and volume, and if desired, height. Both nozzles are tilted inwardly approximately from 30 degrees to 60 degrees from the vertical, and separated by approximately a distance equal to the maximum operating height. Referring to FIGURE 9, the two annular nozzles 7 are fed from duct 6. The air follows the path shown by the arrows, returning through opening 8 of the fan or other air mover.

To attain stability by "compartmentalization," it is common practice to provide in annular jet ground effect vehicles one or more jets of air along the median line, lengthwise or crosswise, or radially. These jets form "curtains" and create more or less independent pockets of pressure under the vehicle, aiding in the stability. The air from these jets has little or no effect on the configuration of this invention, and whether or not they are used is optional within the intent of this invention. It is noted, however, that each of these internal "stability-curtains" may consist of a nozzle, baffle, and internal opening, with an air flow pattern similar to the annular jet air flow pattern.

Figure 7:
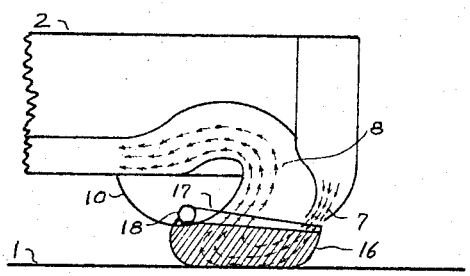

Another possibility with the air flow pattern described in this invention is the use of a flexible bag 16 as shown in FIGURE 7. This bag prevents erosion of and dust from the surface, particularly during hovering flight; or in the case of over-water use, prevents spray from being blown from the surface. The bags are annular in form and may be positioned by means of a number of horizontally extensible and/or rotatable arms 17, pivoting for example around point 18. The bag may be retracted and rolled up or otherwise stored in or about baffle 10 or may be extended from and stored near nozzle 7.

Figure 8:
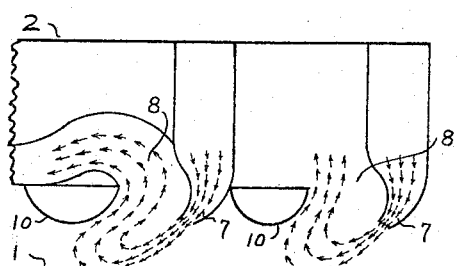

Either the inner or outer or both vertical portions of the bag may be more or less permeable or porous to air if desired to allow air pressure to be maintained beneath the vehicle. To insure that the bag be properly inflated by the nozzle air it should not be completely open on the sides but semi-permeable to air as a cloth bag.

Where it is desired to obtain a higher base pressure, for example in large vehicles, two or more annular nozzles each with its own return duct can be provided as shown in FIGURE 8.

What is claimed is:

In a ground effect vehicle of the annular jet type, means for entraining and enclosing air under pressure beneath said vehicle, comprising a peripheral annular air supply port and an annular air exhaust opening in the base of said vehicle inboard of and adjacent said supply port, said opening having a curved entrance on the inboard side, and said opening forming one end of a duct leading the exhaust air through the vehicle structure for recirculation through said supply port, which supply port and opening dimensions together with the supply air pressure and volume cause the air to flow inboard from said supply port, to or near the ground or water surface, thence curving upwards into said vehicle with little or no loss of air from said vehicle along the surface of the ground or water, and where said vehicle includes an annular flexible semipermeable bag, open at the top, attached to said vehicle with means for extending and positioning said bag beneath both said supply port and said return air opening so as to enclose and deflect the air stream inside the bag while maintaining base pressure, and with means for retracting said bag and stowing same to permit normal motion of said vehicle.

(References on following page)

References Cited by the Examiner

UNITED STATES PATENTS

| | | |
|---|---|---|
| 1,123,589 | 1/1915 | Porter. |
| 2,838,257 | 6/1958 | Wibault. |
| 2,939,649 | 6/1960 | Shaw. |
| 3,001,500 | 9/1961 | Pinnes _____ 180—7 |
| 3,050,146 | 8/1962 | Crim _____ 180—7 |
| 3,067,967 | 12/1962 | Barr _____ 180—7 |
| 3,117,645 | 1/1964 | Cockerell _____ 180—7 |
| 3,165,159 | 1/1965 | Eggington _____ 180—7 |
| 3,174,569 | 3/1965 | Eggington _____ 180—7 |
| 3,174,572 | 3/1965 | Eggington _____ 180—7 |
| 3,181,636 | 5/1965 | Cockerell _____ 180—7 |

FOREIGN PATENTS

| | | |
|---|---|---|
| 219,133 | 11/1958 | Australia. |
| 1,240,721 | 8/1960 | France. |

OTHER REFERENCES

Publication: Symposium on Ground Effect Phenomena; presented October 21–23, 1953, at the Princeton Univ. Pages 135–150.

Publication: "Design News"; May 23, 1960, pages 6 and 7.

Publication: "Flight"; June 24, 1960, pages 868–870.

A. HARRY LEVY, *Primary Examiner.*